US005370025A

United States Patent [19]

Itzov

[11] Patent Number: 5,370,025

[45] Date of Patent: Dec. 6, 1994

[54] MOTORIZED SAW WITH MOVABLE BLADE GUARD ACTUATING LINKAGE

[75] Inventor: Andrew L. Itzov, Menomonee Falls, Wis.

[73] Assignee: Milwaukee Electric Tool Corporation, Brookfield, Wis.

[21] Appl. No.: 135,281

[22] Filed: Oct. 12, 1993

Related U.S. Application Data

[63] Continuation of Ser. No. 929,113, Aug. 13, 1992, abandoned.

[51] Int. Cl.[5] .......................... B27G 19/04; B23D 59/00

[52] U.S. Cl. .......................... 83/397; 83/471.3; 83/478; 83/481; 83/490; 83/522.24

[58] Field of Search .................. 83/397, 478, 490, 481, 83/522.24, 471.3

[56] References Cited

U.S. PATENT DOCUMENTS 3,706,332 12/1972 George .......... 143/159
3,730,239 5/1973 Kaman et al. .......... 143/159 H
3,787,973 1/1974 Beisch et al. .......... 30/391
3,913,437 10/1975 Speer et al. .......... 83/478
3,922,785 12/1975 Fushiya .......... 30/391
3,998,121 12/1976 Bennett .......... 83/471.3
4,343,213 8/1982 Drixler .......... 83/397
4,532,841 8/1985 Stackhouse, Jr. .......... 83/102.1
4,581,966 4/1986 Kaiser et al. .......... 83/397
4,774,866 10/1988 Dehari et al. .......... 83/478
4,799,416 1/1989 Kumasaka et al. .......... 83/397
4,805,504 2/1989 Fushiya et al. .......... 83/397
4,869,142 9/1989 Sato et al. .......... 83/467.1
4,934,233 6/1990 Brundage et al. .......... 83/397
5,020,406 6/1991 Sasaki et al. .......... 83/397
5,042,348 8/1991 Brundage et al. .......... 83/471.3
5,054,352 10/1991 Fushiya et al. .......... 83/468.3

*Primary Examiner*—Hien H. Phan
*Attorney, Agent, or Firm*—Michael, Best & Friedrich

[57] ABSTRACT

A motorized saw comprising a base having a work piece support, and a cutting station at which a work piece is cut; a cutting unit including a motor, an arbor on which a saw blade can be removably mounted for rotation about an arbor axis driven by the motor, and a movable guard, movable between surround and non-surround positions relative to a lower portion of the saw blade; mounting apparatus securing the cutting unit on the base for movement between a non-cutting position remote from the cutting station and a cutting position which places the saw blade at the cutting station; a movable guard actuating apparatus connected between the base and the movable guard to progressively move the movable guard toward the non-surrounding position as the saw blade cuts through the work piece at the cutting station, the actuating apparatus includes a lost motion member permitting the movable guard to be freely moved by manual actuation thereof to the non-surrounding position only when the cutting unit is in the non-cutting position to expose the saw blade for removal; a lockout apparatus automatically contactable by the movable guard actuating apparatus when the movable guard is in the non-surrounding position for preventing movement of the cutting unit from the non-cutting position until the movable guard is returned to the saw blade surrounding position.

20 Claims, 4 Drawing Sheets

MOTORIZED SAW WITH MOVABLE BLADE GUARD ACTUATING LINKAGE

This application is a continuation of application Ser. No. 07/929,113, filed Aug. 13, 1992, and which has been abandoned in favor of this application.

BACKGROUND OF THE INVENTION

The invention relates to a power miter saw or slide compound miter saw for use in carpentry and other cutting crafts. More particularly, the invention relates to a linkage arrangement that will automatically align a movable blade guard, allow free rotation of the blade guard to a non-surround position, and provide a lockout which prevents effective use of the cutting unit when the blade guard has been moved to the non-surround position.

Power miter saws and power slide compound miter saws have been used as a quick and efficient way of making angular cuts in a work piece, usually a portion of a chair rail, baseboard, crown molding or aluminum siding. An angle cut is necessary to form a mating joint with a similar piece of wood having a mating surface comprised of an opposing angle face complimentary to that of the mated work piece. Typically, these joints are found at the corners of the room, doors and windows. The angle required varies according to the shape of the room and other requirements particular to the application.

Power miter saws and the like typically have a base with a turntable mounted thereon. A cutting unit is mounted on the turntable for movement between cutting and non-cutting positions and includes an electric motor supporting a circular saw blade. The combination of the motor and saw blade is typically housed in the cutting unit. The cutting unit housing covers approximately the upper half of the circular saw blade leaving the lower half of the blade exposed.

A lower blade guard is normally provided which protects or covers an optimum amount of the lower half of the circular saw blade. It is knoll in the art to provide a movable lower blade guard with an actuating mechanism so that when the cutting unit is in the at rest, non-cutting position, the movable blade guard is in a surround position covering the saw blade. As the cutting unit is moved to a cutting position, the movable blade guard rotates from the surround position to a non-surround position to allow the saw blade to contact and cut a work piece. To achieve this operation the lower movable blade guard must be precisely adjusted to the optimum surround position relative to the lower half of the blade. Because the upper and lower blade guards, in combination, substantially cover the saw blade, provision is made to allow the movable lower blade guard to be manually movable to a non-surround position to allow replacement or changing of the blade.

The prior art recognizes that it is desirable to prevent unintentional manual movement of the movable guard to the non-surround position and it is known to provide some type of guard locking arrangement that must be released before the movable guard can be moved to the non-surround position. Such locking arrangements frequently require the use of a separate tool in order to effect the unlocking. Users prefer that there be no locking arrangement so that the guard is free to be moved to a non-surround position without going through an unlocking procedure. However, if the guard design permits such free guard movement the cutting unit can be moved to a cutting position without returning the guard to a blade surrounding position. In addition if the movable blade guard is freely movable, the guard could be permanently secured in the non-surround position.

Another problem exists in assembling the movable guard and its actuating mechanism on the cutting unit. In the assembly of miter saws careful setting of the movable guard to an optimum surround position is manually made by the assembler. In addition, the actuating mechanism for the blade guard must also be manually set for proper guard raising action. Because these two settings are interrelated the making of one setting frequently alters the other setting thus requiring it to be reset. The set and reset alignment procedure is time consuming, increases the cost of assembly, and can result in the saw being initially assembled with improper settings which increases the cost of inspection and quality control.

In summary, the problem that exists is how to provide a simple low cost, rugged guard arrangement that will allow the desired free manual movement of the miter saw blade movable guard to a non-surround position, and which will automatically prevent the cutting unit from being moved to a cutting position while the movable guard is in the non-surround position. In addition, known guard arrangements do not address the assembly alignment setting problems and there is a need for guard arrangement that will enable an assembler to make one simple alignment setting that simultaneously places the movable blade guard at an optimum surround position and also sets the guard actuating linkage for proper operation.

U.S. Pat. No. 5,054,352, issued to Fushiya et al., illustrates a power miter saw including a lower blade guard movable from a surround position to a non-surround position. The lower blade guard is freely movable in that it does not include a locking means which must be released before the blade guard can be rotated from its surround position to its non-surround position. The Fushiya et al. miter saw does not include an arrangement which prevents lowering of the cutting unit when the lower blade guard is in the non-surround position.

U.S. Pat. No. 4,934,233, issued to Brundage et al., shows a power miter saw including a swinging lower blade guard for covering the lower, or cutting portion of the circular saw blade. In order to rotate the lower blade guard to the non-surround position and expose the blade for removal, a threaded fastener must first be loosened.

U.S. Pat. No. 4,805,504, issued to Fushiya et al., illustrates a power miter saw having an actuating means disposed between the cutting unit and the lower blade guard for directly associating the movement of the lower blade guard with pivotable movement of the cutting unit. An engaging pin must first be released to allow the actuating means to rotate allowing movement of the lower blade guard.

U.S. Pat. No. 4,774,866, issued to Dehari et al., shows a saw blade guard arrangement in an electrically power miter saw. The linkage arrangement supporting the lower blade guard for pivotal movement from a surround position to a non-surround position allows for free manual movement of the blade guard. The Dehari et al. miter saw also includes an apparatus for adjusting the position of the saw arm and, as a result, the position of the lower blade guard, but does not include a linkage arrangement that locks the cutting unit in the non-cutting position when the blade guard is in the non-surround position.

U.S. Pat. No. 4,581,966, issued to Kaiser et al., illustrates a power miter saw including a linkage system for mounting the lower blade guard for movement from a surround position to a non-surround position. To accommodate changing of the saw blade, a pivot bolt must be partially withdrawn using conventional hand tools to unlock the linkage arrangement and free the blade guard for pivotal movement. The pivot bolt has a head which prevents the cutting unit from being lowered to its cutting position until the lever has been returned to its normal position and the pivot bolt is put back into place.

U.S. Pat. No. 4,343,213, issued to Drixler, shows a power miter saw having a lower blade guard adapted to move from a surround position to a non-surround position. The lower blade guard assembly includes a cam-following roller 78 which engages a recess 76 to compulsorily lock the lower blade guard in its maximum cover position when the cutting unit is in the raised at rest position, but does not include an arrangement allowing free movement of the lower blade guard when the cutting unit is in the at rest position.

Attention is also directed to the following U.S. Patents which further show the state of the art in saw blade guard assemblies.

| | | |
|---|---|---|
| U.S. Pat. No. 5,042,348 | Brundage et al. | 8/27/91 |
| U.S. Pat. No. 5,020,406 | Sasaki et al. | 6/4/91 |
| U.S. Pat. No. 4,869,142 | Sato et al. | 9/26/89 |
| U.S. Pat. No. 4,799,416 | Kumasaka et al. | 1/24/89 |
| U.S. Pat. No. 4,532,841 | Stackhouse, Jr. | 8/6/85 |
| U.S. Pat. No. 3,998,121 | Bennett | 12/21/76 |
| U.S. Pat. No. 3,922,785 | Fushiya | 12/2/75 |
| U.S. Pat. No. 3,913,437 | Speer et al. | 10/21/75 |
| U.S. Pat. No. 3,787,973 | Beisch et al. | 1/29/74 |
| U.S. Pat. No. 3,730,239 | Kaman et al. | 5/1/73 |
| U.S. Pat. No. 3,706,332 | George | 12/19/72 |

SUMMARY OF THE INVENTION

The invention provides a motorized saw including a base having a work piece support, and a cutting station at which a work piece is cut. The cutting unit has a motor, an arbor on which a saw blade can be removably mounted for rotation about an arbor axis driven by the motor, and a movable guard movable between surrounding and non-surrounding positions relative to a lower portion of the saw blade. The saw includes mounting means to secure the cutting unit on the base means for movement between a non-cutting position remote from the cutting station and a cutting position which places the saw blade at the cutting station. A movable guard actuating means is connected between the base and the movable guard to progressively move the movable guard toward the non-surrounding position as the saw blade cuts through the work piece at the cutting station. The saw also has an actuating means which includes a lost motion means permitting the movable guard to be freely moved by manual actuation thereof to the non-surrounding position only when the cutting unit is in the non-cutting position to expose the saw blade for removal; and lock-out means automatically contacting the movable guard actuating means when the movable guard is in the non-surrounding position. The lock-out means prevents movement of the cutting unit from the non-cutting position until the movable guard is returned to the saw blade surrounding position.

The construction of the saw embodying the invention is an improvement over prior art saws in that it provides a guard arrangement allowing free manual movement of the miter saw blade guard from a surround position to a non-surround position when the cutting unit is in the non-cutting position and prevents the cutting unit from movement to a cutting position while the guard is in the non-surround position. Furthermore, the invention provides a simple arrangement whereby an assembler need only make one adjustment to place the guard at an optimum surround position and set the guard linkage for proper operation.

DETAILED DESCRIPTION OF THE PREFERRED EMBODIMENT

Figure 1:
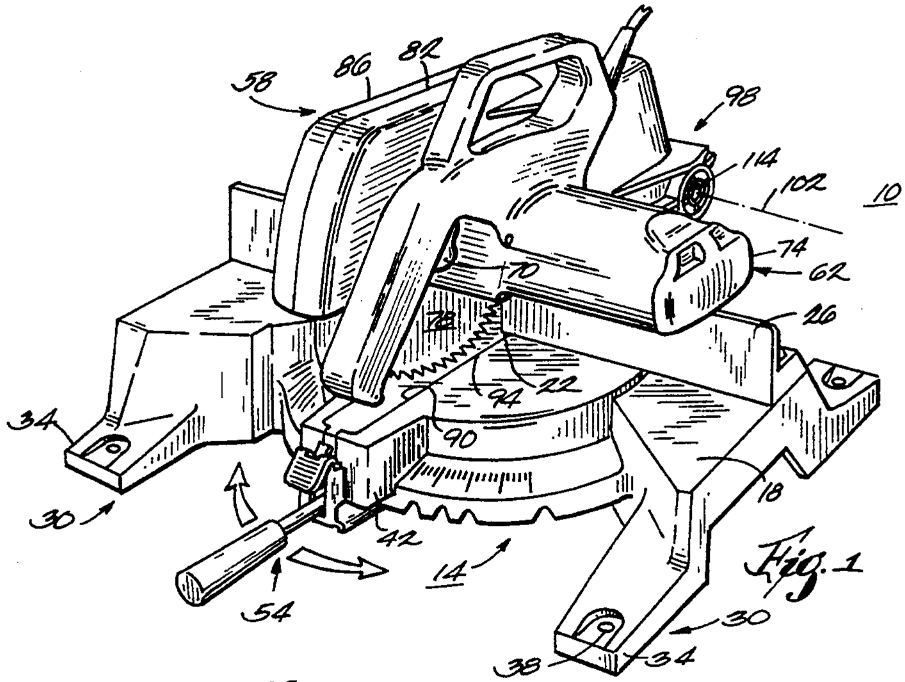
FIG. 1 is a perspective view of the miter saw showing the cutting unit in the cutting position.

FIGS. 1, 2, 3, and 4 generally illustrate the miter saw 10 having a movable blade guard linkage arrangement 198 embodying the invention. The miter saw 10 will be described first, then the movable blade guard linkage arrangement 198 and the operation thereof will be described.

The miter saw 10 generally includes a base means or base 14 having a work piece support surface 18, and a cutting station 22 on which the work piece (not shown) is placed to be cut. The cutting station includes a fence 26 bolted to the work piece support surface 18 to provide a support against which the work piece can be held during the cutting process. The base 14 also includes a stable means of support 30 comprising four widely spaced feet 34 each including a bore 38 which could accommodate a bolt (not shown) for securing the saw unit 10 to a work bench or table (not shown).

Figure 2:
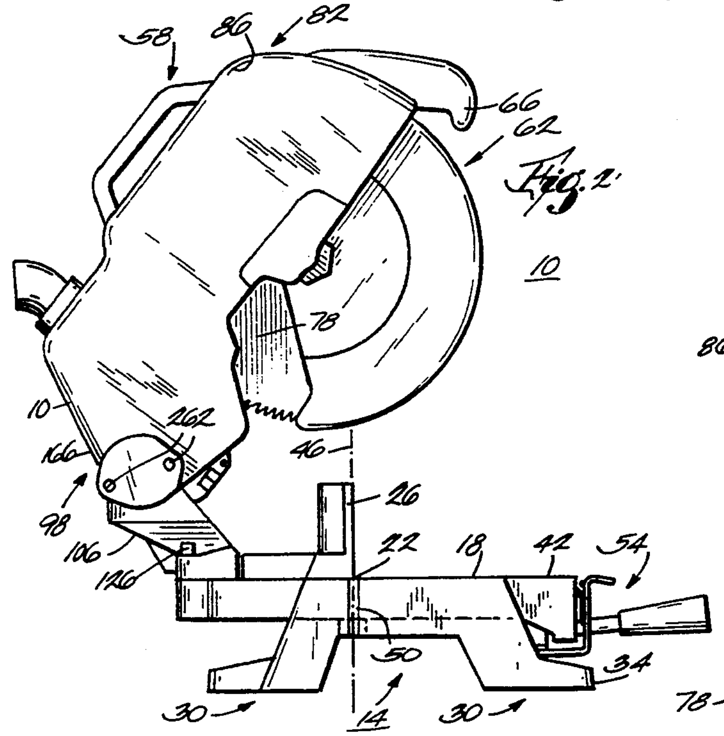
FIG. 2 is a side elevational view of the miter saw showing the cutting unit in the non-cutting position.
Figure 3:
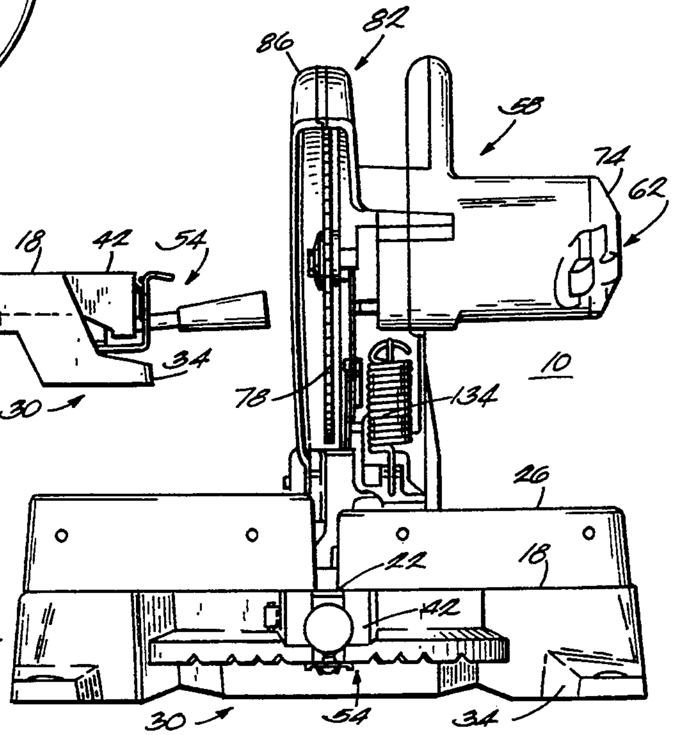
FIG. 3 is a front elevational view of the miter saw showing the cutting unit in the cutting position.

The base 14 also includes a turntable 42 mounted thereon for rotational movement about a vertical axis 46 extending longitudinally along a turntable pivot shaft 50 (FIG. 2). The turntable pivot shaft 50 may simply rest unsecured in the base, or alternatively, the turntable 42 may include a bolt or nut means (not shown) to secure the turntable to the base for rotation about the vertical axis 46. In arrangements where the turntable is not secured to the base by other means, the work piece fence 26 also operates to hold the turntable 42 in place on the base 14. The turntable is held in any desired position of angular adjustment by a turntable position locking means 52.

Also shown in FIGS. 1, 2, 3, and 4 is a cutting unit 54 mounted on the turntable. The cutting unit of the preferred embodiment includes a motorized circular saw having a pull arm or actuating handle 58 with a trigger switch 62, an arbor 66 driven by a motor 74, for rotation about an arbor axis 70 (FIG. 3), a removable saw blade 78 mounted on the arbor for rotation about the axis of the arbor, an upper fixed blade guard 82, and a movable lower blade guard 86. While the embodiment shown in the drawings is a miter saw for cutting simple angles, the saw embodying the invention may also be used in a compound miter saw for cutting compound angles or another similar power tool.

Figure 4:
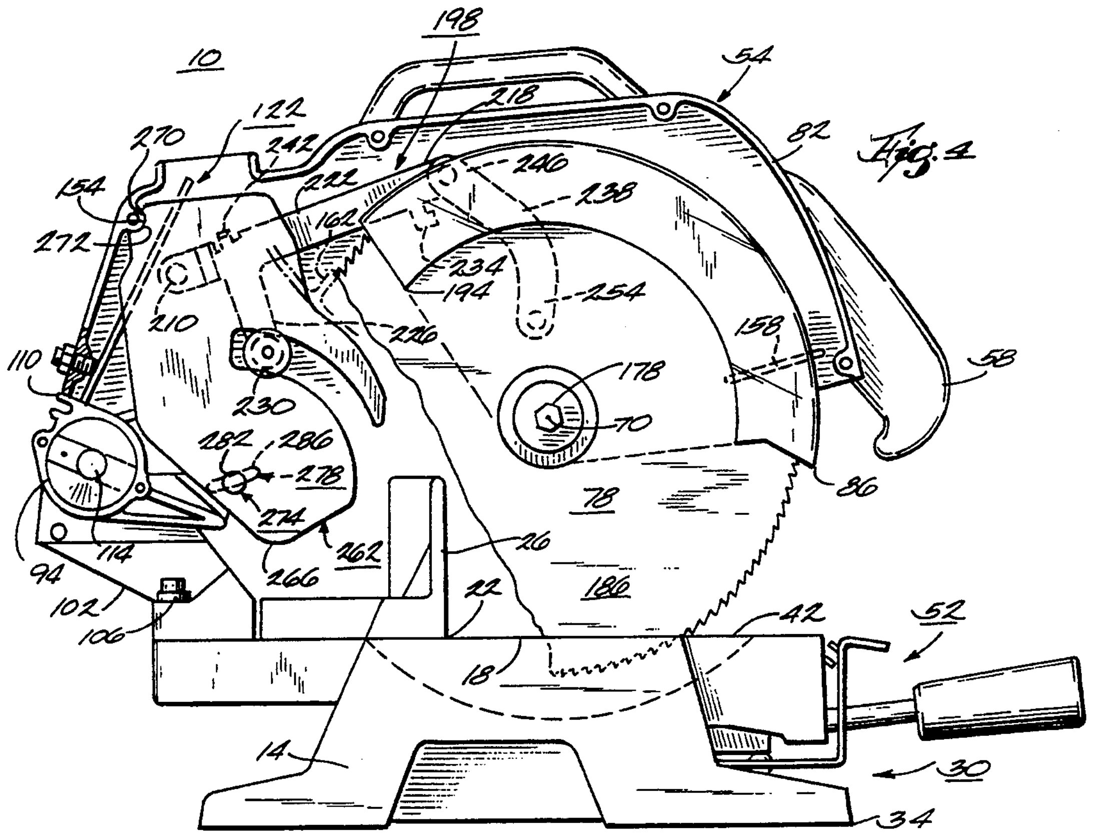
FIG. 4 is a side elevational view of the miter saw showing the saw partway through the range of cutting travel with the removable cover off, and portions cutaway.

The cutting unit also includes a mounting means 90 for securing the cutting unit 54 on the turntable 42 of the base 14 for movement from a non-cutting position remote from the cutting station to a cutting position which places the saw blade at the cutting station. It is common in the art to translate the movement of the cutting unit 54 into simultaneous movement of the movable blade guard 86. Thus, the movable blade guard 86 typically moves from a surround position, when the cutting unit is in the non-cutting position (FIG. 6), to a non-surround position when the cutting unit is in the cutting position (FIG. 4). The details of this movement will be described below.

Figure 8:
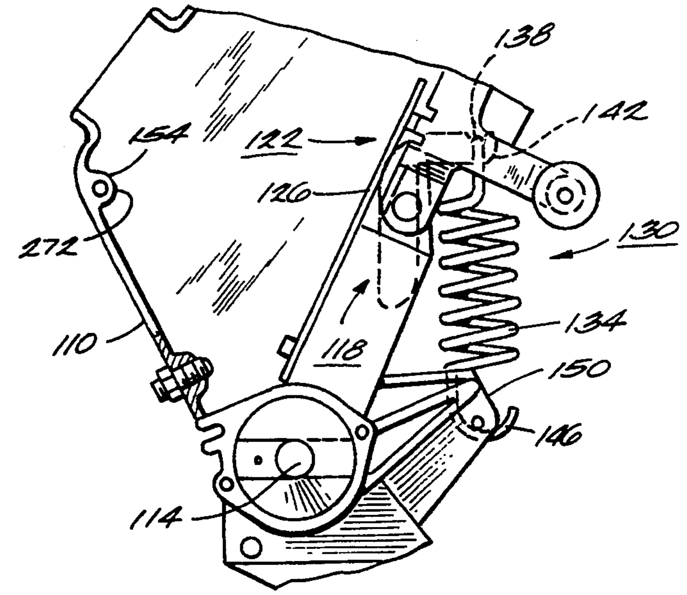
FIG. 8 is an enlarged view of the mounting means securing the cutting unit on the base.

In the preferred embodiment, the cutting unit 54 is mounted on the turntable 42 by the mounting means 90 and travels with the turntable as it rotates about the aforementioned vertical axis 46. The mounting means 90 includes a pivot mounting means or hinge assembly 94 which provides for rotation of the cutting unit about a generally horizontal axis or main pivot axis 98 (shown in FIG. 1). The hinge assembly 94 includes a lower hinge portion or cutting unit support member 102 secured to the base preferably by a pair of bolts 106 (only one of which can be seen in FIGS. 2 and 4) threaded through the lower hinge portion 102 into the turntable 42. Also included is an upper hinge portion or main pivot member 110 connected to the lower hinge portion 102 by some form of an axle or pivot pin 114 (best shown in FIG. 1). The main pivot member 110 is connected to permit rotation of the cutting unit 54 about the horizontal or main pivot axis 98. Thus, in operation the cutting unit 54 is provided with two relative planes of motion: the first being rotation about the generally horizontal main pivot axis 98 of pin 114 and relative to the turntable 42, and the second being rotation about the generally vertical axis 46 and relative to the base means 14. The cutting unit support member 102 also includes an end portion 118 radially spaced from the main pivot axis 98 and, as shown in FIG. 8, a biasing means 122 is mounted on the end portion of the cutting unit support member 102 for constantly urging the movable guard 86 to the blade surround position. While any biasing means is suitable, the preferred embodiment provides a leaf spring 126 connected to transmit the biasing force to the movable blade guard in a manner which will be described below.

The hinge assembly 94, as best shown in FIG. 8, preferably includes a biasing means 130 for biasing the cutting unit 54 to its non-cutting position. The biasing means shown includes an helical spring 134 having an upper end 138 supported by a men%her 142 extending vertically from the cutting unit support member 102. The lower end 146 of the spring is connected to a latch arm 150 mounted on the main pivot member 110.

Figure 5:
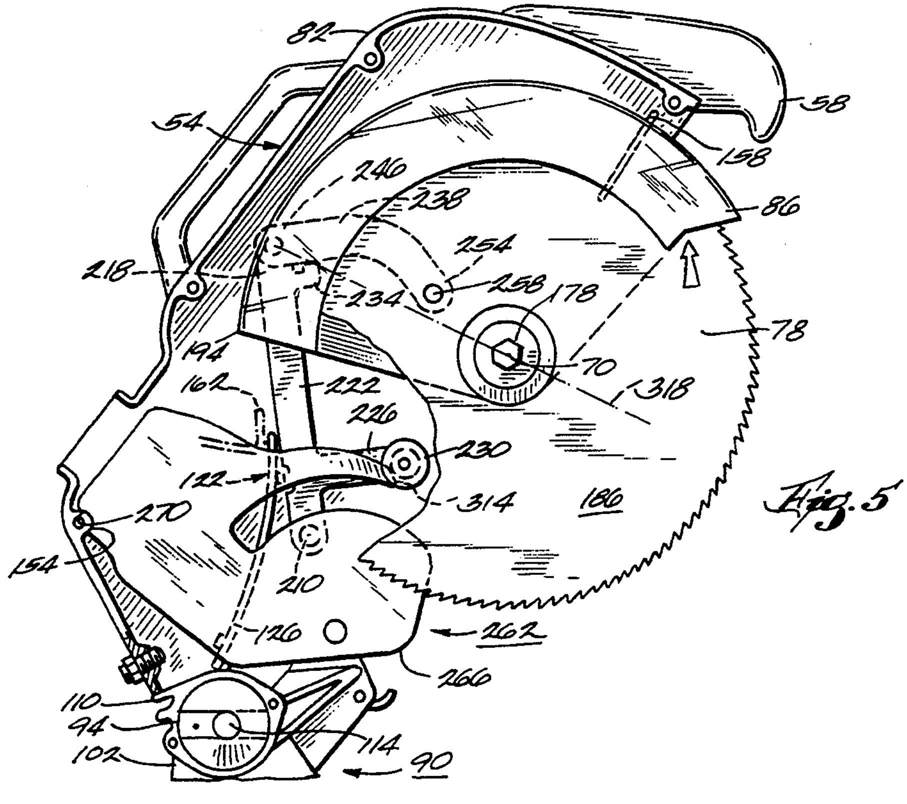
FIG. 5 is a partial side elevational view showing the cutting unit in the non-cutting position with the movable blade guard raised to the lock-out position.
Figures 6, 7:
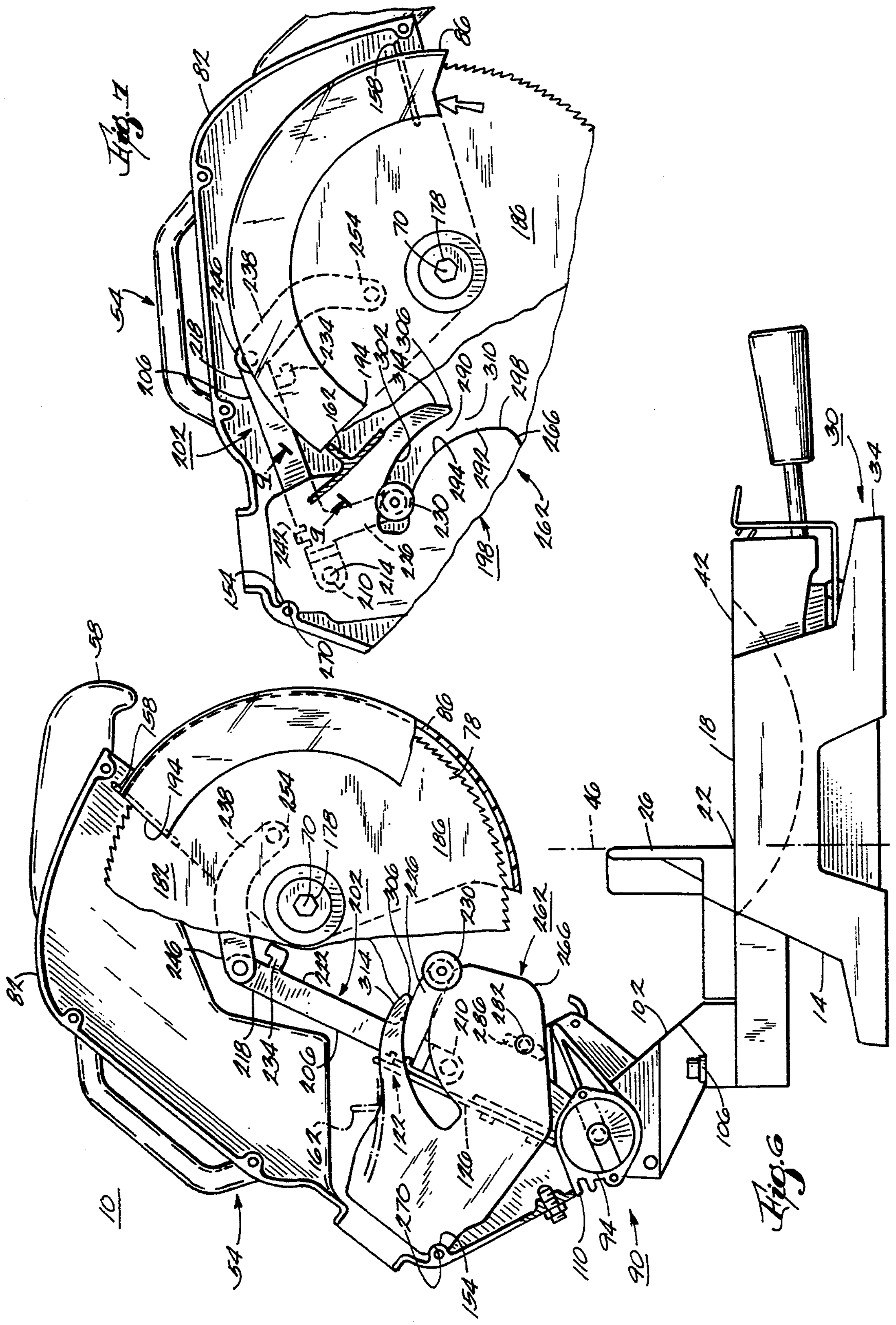
FIG. 6 is a side elevational view of the miter saw showing the cutting unit in its non-cutting position with portions cut-away to show the movable blade guard linkage arrangement.
FIG. 7 is a partial side elevational view of the cutting unit with portions cut-away and in a partially covered position to show the movable blade guard linkage arrangement in an intermediate position of travel.
Figure 9:
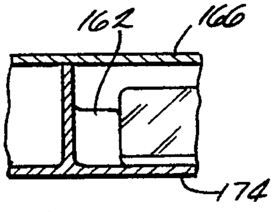
FIG. 9 is a cross-sectional view taken along the lines 9—9 in FIG. 7.

In the preferred embodiment, the main pivot member 110 of the cutting unit 54 is formed integral with the upper fixed saw blade guard 82 covering a portion of the saw blade 78. The fixed guard 82 comprises two components: a main housing portion 170 (FIG. 3) cast or formed from an appropriate material which includes the main pivot men%her 110 (FIGS. 4, 5, and 6) of the cutting unit; and a similarly cast or formed removable cover portion 174 for mounting on the main housing portion. The two housing portions are detachably secured together by suitable means such as mounting screws (not shown) or other appropriate means. The main housing portion 170 has a first index means 158 in the form of a bead line cast thereon, the function of which will be more fully explained below. Additionally, the removable cover portion 174 of the fixed saw blade guard 82 includes a movable guard stop member or second stop member 162 which prevents the movable guard 86 from rotating to a position where it could be locked in the non-surround position. The stop member 162 is best shown in FIGS. 5, 7, and 9 as a cut-away portion of the removable cover portion 174.

Referring now to FIGS. 1 through 6, the cutting unit of the preferred embodiment additionally includes the saw blade arbor 66 (best shown in FIG. 3) rotatably driven by the motor 74. The saw blade 78 is removably mounted on the arbor by a cap screw 178, in the conventional manner. The cap-screw 178 can be removed to accommodate removal of the saw blade. The saw blade when mounted on the arbor, will have an upper portion 182 generally covered by the fixed blade guard 82, and a lower exposeable portion 186, for contact with the workpiece and which is covered by the movable blade guard 86 while the cutting unit is in the non-cutting position. If desired, a blade arbor cap screw cover 88 (FIG. 2) may be provided to shield cap screw 178. Such a cover is not essential but if used it could be pivotally mounted for arcuate movement into and out of overlying relation to cap screw 178 and have a slip notch enabling it to be retained in overlying relation by a suitable releasable fastener.

The movable blade guard 86 of the preferred embodiment comprises a plastic shield 190 (best shown in FIG. 10) which generally resembles a pie-shaped third of a generally annular disc and which has an upper end 194 constituting a second index means, the function of which will be explained below. As seen in FIGS. 4 through 7 and also in FIG. 10, the movable blade guard of the preferred embodiment is mounted for rotation about the arbor axis 70 to allow for rotation of the movable blade guard from a surround position to a non-surround position relative to the lower portion of the saw blade.

Figure 10:
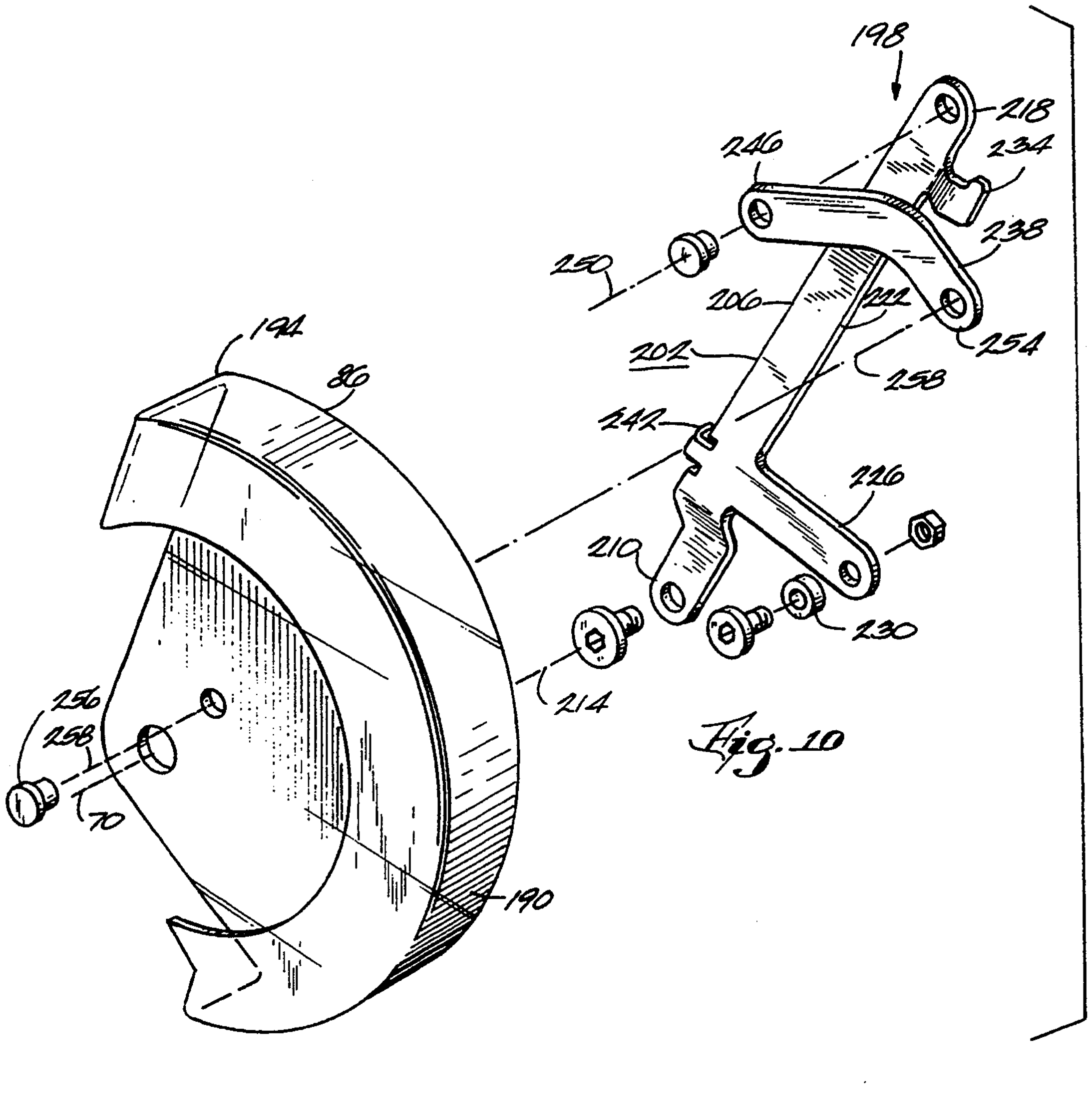
FIG. 10 is an enlarged and exploded view of the functional elements of the movable guard linkage arrangement.

The power miter saw embodying the invention also includes a movable guard actuating means or linkage 198 (FIGS. 4–7 and 10) connected between the base means 14 and the movable guard 86 to progressively rotate the movable guard about the arbor axis 70 toward a non-surround position as the cutting unit 54 is moved to the cutting position and the saw blade cuts through the work piece at the cutting station. The movable guard actuating means includes first and second link means 202 and 238. The first link means 202 is in the form of a bell crank 206 (FIG. 10). The first link means has one end 210 which serves as a fulcrum mounted on the cutting unit support member end portion 118 for rotation about a first pivot axis 214 and a free end 218 in spaced relation to the fulcrum end 210 which is connected to the second link means 238 as will be described below. More specifically, the bell crank 206 has a pair of arms 222, 226 extending from the fulcrum end with one of the arms 222 having free end 218 thereon in spaced relation to the one end 210 and the other arm 226 provides a support for a cam following roller or cam follower 230 mounted thereon.

The bell crank 206 also includes first and second tabs 234, and 242: the first tab being a first stop member for contact with the second link means 238 and the second tab being a contact point for the leaf spring biasing means 126. The contact point transmits the biasing force of the leaf spring through the linkage arrangement to the movable guard to bias the guard to the surround position when the cutting unit is in the non-cutting position.

The second link means 238 has one end portion 246 connected to the free end 218 of the first link means 202 for movement about a second axis 250. The second link means has another end portion 254 which is pivotally mounted on the movable blade guard 86 by connector 256 for movement about a third axis 258. In the preferred form of the invention, the third axis 258 of the second link means is mounted eccentric to the arbor axis 70 of the cutting unit.

The movable guard actuating means 198 also includes a cam means 262 mounted on the main pivot member 110. The cam means provided includes a cam plate 266 having a keyway 270 dimensioned to receive a locating key 154 cast directly into the main pivot member. The locating key has a bearing surface which provides a fulcrum 272 for the cam plate. The keyway 270 is in register with the bearing surface to allow for angular adjustment of the cam plate about the fulcrum. The adjustment allows one to place the cam plate 266 in an optimum operating position relative to the cam follower 230 and to also set the degree to which the movable guard 86 surrounds the lower portion 186 of the blade. The detail structure of the cam plate 266, an alignment means 278 for placing cam plate 266 at the optimum position and a releasable fastening means 274 to retain the cam plate in the optimum position will now be explained.

As shown in FIGS. 4 through 7 and with particular reference to FIG. 7, the cam plate of the preferred embodiment also includes an arcuate cam slot 290, that has an inner cam follower margin 294 having an inner terminal end 298 and an outer cam margin 302 radially spaced outward from the inner cam follower margin 294 that has an outer terminal end 306. The inner and outer terminal ends are angularly and radially offset and together define a lost motion space 310 adjacent the outer terminal end of the outer cam margin and above the inner cam follower margin in which the cam follower 230 normally resides when the cutting unit is in the raised non-cutting position as shown in FIG. 6. Immediately above lost motion space 310 is a lockout means 314 in the form of an abutment also contactable by the cam follower 230.

As discussed earlier the movable guard actuating means also includes the cam follower 230 which is mounted on one of the arms 226 of the first link means 202 for contact with either the cam means 262 or the lock-out means abutment 314. In normal cutting operation, and as shown in FIGS. 4 and 6, during movement of the cutting unit 54 from the non-cutting position (FIG. 6) to the cutting position (FIG. 4), the cam follower 230 follows along the inner cam follower margin 294 of the cam means 262 so that the movable guard 86 rotates from the surround position to the non-surround position. This action is more fully explained below.

The releasable fastening means 274 with an associated alignment means 278 (shown in FIGS. 4 and 6) operates to secure the cam plate on the main pivot member 110 when the keyway 270 and locating key 154 are in register with each other. In the preferred form of the invention, the releasable fastening means 274 includes a resealable fastener or cap screw 282 which fits into an oversized aperture 286 in the cam plate 266 and into a threaded bore (not shown) in the main pivot member 110. The oversized aperture 286 allows angular adjustment of the cam plate 266 about the bearing surface of key 154 in the following manner. The cam plate is positioned with the keyway 270 in register with the bearing surface 274. The cap-screw 282 is then placed through the oversized aperture 286 and threaded into the receiving bore on the cutting unit support member 102. Before the cap-screw 286 is fully tightened, the cam plate 266 may be adjusted to its optimum position by moving the oversized aperture 286 around the cap-screw 282 thereby providing the alignment as will now be explained. An alignment means 278 is used to set the optimum position of the cam plate. Referring to FIG. 6 the alignment means includes the first and second index means 158 and 194. The first index means 158 comprises the raised bead line on the inside of the upper fixed guard 82. The second index means 194 comprises the upper radial end of movable guard 86 but could comprise an indexing line on the guard itself. The second index means is aligned with the first index means through the assembler's adjustment of the cam plate 266 and the resulting actions of cam means 262 and cam follower 230, thence to first and second links, 206 and 238, respectively, and the movable blade guard 86. When this adjustment is complete, the cam plate 266 can be secured in the optimum position by the releasable fastening means 274 previously described.

When the cutting unit 54 is in the at rest position as shown in FIG. 6, the movable guard 86 is completely free to be manually rotated from the surround position to the non-surround position (FIG. 5). However, when this is done the cam follower 230 immediately leaves the inner cam follower margin 294 and engages the lock-out means abutment 314 which, in the preferred embodiment, is adjacent the outer terminal end 306 of the outer cam follower margin 302. The saw blade 78 is now exposed for removal and replacement. In this position, any attempt to move the cutting unit 54 toward the cutting position with the blade 78 exposed will cause the movable guard actuating means 198 to force cam follower 230 against abutment 314, as shown in FIG. 5, and prevent movement of the cutting unit 54 from the non-cutting position until the movable blade guard 86 is returned to the saw blade surround position.

As shown in FIG. 5, with movable guard 86 in its non-surround position the first stop men,her 234 of the bell crank 206 contacts the second link means 238 to prevent further movement of the movable blade guard 86. This stop member 234 is provided to prevent the third pivot axis 258 from passing over a center line 318 extending between the second pivot axis 250 and the arbor axis 70 (FIG. 5). Allowing such a movement to occur would lock the linkage in a non-operative state with the movable blade guard 86 in the non-surround position and would prevent the cutting unit 54 from returning fully to its non-cutting position.

Under normal cutting operation, as the cutting unit 54 is moved from the non-cutting position towards the cutting position, the cam follower 230 begins to move along the cam follower margin 294. The cam follower 230 is held on the cam margin 294 because of a force caused by gravity acting on the lower blade guard 86 and transmitted to the cam follower 230 via the linkage arrangement 198. Thus, bell crank 206 on which the cam follower 230 is mounted rotates about the first pivot axis 214. This action causes a relative rotation of the bell crank 206 and, second link 238 about the second pivot axis 250. However, the linkage arrangement 198 includes a built in mechanical hysteresis between the planetary rotation of the second pivot 250 about the first pivot axis 214 and the rotation of the cutting unit 54 about the main pivot axis 98 on support member 102. As a result, the second pivot axis 250 lags behind relative to the rotation of the cutting unit. This hysteresis causes the bell crank 206 to "pull" on the second link means creating a tendency for the third pivot axis 258 (created by the connection of the second link means 238 to the movable guard) to rotate about the first pivot axis 214. Because of the eccentric location of the third pivot axis 258 on the movable guard, the movable guard is forced to rotate about the arbor axis 70 along with the third pivot axis 258. In this manner the movable guard 86 is brought to a non-surround position as the cutting unit 54 is moved to the cutting position. In this position, and with the cutting unit 54 in the cutting position, care must be taken that the movable guard 86 is not rotated further thereby rotating the third pivot axis 255 over the center line 318 extending from the second pivot axis 250 to the arbor axis 70. To this end, the second stop member 162 (FIGS. 7 and 9) is provided on the removable cover 174 of the cutting unit 54. Any attempt to rotate the movable blade guard 86 further into the fixed blade guard 82 will be prevented by contact between the movable guard 86 and the second stop member 162.

As the cutting unit 54 is raised from the cutting to the non-cutting position, the action of the linkage 198 moves substantially in reverse of the movement outlined above to return the movable guard 86 to the surround position. As the cutting unit 54 nears the raised, at-rest position, the leaf spring 126 transmits force to the linkage arrangement 198 through contact with the leaf spring contact point 242 thereby adding to the force of gravity, already pulling the movable blade guard 86 to the surround position, to solidly, smoothly, and more forcefully rotate the movable blade guard 86 to the surround position. Should the movable blade guard 86 experience frictional or other position, the cam follower 230 will engage the outer cam margin 302 which will force the cam follower 230 along its predetermined path thereby forcing the movable blade guard 86 to the surround position.

Various features of the invention are set forth in the following claims.

What is claimed is:

1. A cutting tool comprising:

a base including a support member;

a pivot shaft having a longitudinal axis and being supported by the support member;

an arm mounted on the pivot shaft for pivotal movement about the axis;

a cutting unit mounted on the arm for movement therewith between cutting and non-cutting positions, the cutting unit including a cutting blade mounted for rotation about an arbor axis, having a lower portion and having a blade guard supported for movement between a surrounding position wherein the blade guard surrounds the lower portion of the cutting blade and a non-surrounding position wherein the lower portion of the cutting blade is exposed for cutting;

means for causing movement of the blade guard between the surrounding and non-surrounding positions in response to movement of the cutting unit between non-cutting and cutting positions, and the blade guard being freely manually pivotally movable from the surrounding position to the non-surrounding position whenever the cutting unit is in the non-cutting position to expose the saw blade for removal; and means for preventing movement of the cutting unit from the non-cutting position whenever the movable guard is rotated to the non-surrounding position to expose the saw blade for removal.

2. A cutting tool as set forth in claim 1 wherein the means for causing movement of the blade guard includes:

a bell crank having a first end pivotally connected to the support arm for movement about a first axis, having a second end spaced from the first end and having a cam follower; and a link arm having opposite ends, one of the link arm ends being pivotally connected to the second end of the bell crank for movement about a second axis, and the other end of the link arm being pivotally connected to the blade guard for movement about a third axis.

3. A cutting tool as set forth in claim 2 wherein the means for causing movement of the blade guard includes a cam plate connected to the cutting unit, the cam plate having a cam surface adapted to engage the cam follower so that movement of the cutting unit from the non-cutting position to the cutting position causes movement of the blade guard from the surrounding position to the non-surrounding position, and wherein the means for preventing movement of the cutting unit from the non-cutting position until the movable guard is returned to the surrounding position includes a lost motion member on the cam plate, the lost motion member including a surface opposing and generally parallel to the cam surface, so that the lost motion member prevents manual movement of the lower blade guard whenever the cutting unit is out of the non-cutting position and so that the blade guard is freely manually movable to the non-surrounding position whenever the cutting unit is in the non-cutting position.

4. A cutting tool as set forth in claim 3 wherein the cam plate includes an end on the lost motion member, the end having a surface engaging the cam follower whenever the blade guard is manually pivoted to the non-surrounding position to prevent movement of the cutting unit from the non-cutting position to the cutting position whenever the blade guard has been manually pivoted to the non-surrounding position.

5. A cutting tool as set forth in claim 3 wherein the cam plate includes a keyway and wherein the cutting unit includes a housing having thereon a locating key contacting the keyway so that the cam plate is angularly adjustable about the locating key to an optimum operating position relative to the cam follower.

6. A cutting tool as set forth in claim 2 wherein the cutting unit has a first index, and wherein the blade guard has a second index, and wherein the cam plate is adjustable about the locating key relative to the cutting unit to cause movement of the blade guard so that when the second index of the lower blade guard is in alignment with the first index on the housing, the cam plate is in the optimum operating position.

7. A cutting unit as set forth in claim 2 wherein the bell crank has thereon a stop member contacting the link arm when the blade guard is moved to the non-surrounding position and the cutting unit is in the non-cutting position to prevent the third pivot axis from passing over a line extending between the second pivot axis and the arbor axis, and wherein the cutting unit includes a stop member contacting the blade guard whenever the blade guard is moved to the non-surrounding position and while the cutting unit is in the cutting position to prevent the third pivot axis from passing over a line extending between the second pivot axis and the arbor axis.

8. A cutting tool as set forth in claim 1 wherein the means for causing movement of the blade guard includes a leaf spring member connected between the support member and the bell crank to bias the movable blade guard to the surrounding position.

9. A cutting tool comprising:

a base including a support member;

a pivot shaft having a longitudinal axis and being supported by the support member;

an arm mounted on the pivot shaft for pivotal movement about the axis;

a cutting unit mounted on the arm for movement therewith between cutting and non-cutting positions, the cutting unit including an arbor mounted for rotation about an arbor axis, a cutting blade mounted on the arbor and having a lower portion and a blade guard supported for pivotal movement about the arbor axis between a surrounding position wherein the blade guard surrounds the lower portion of the cutting blade and a non-surrounding position wherein the lower portion of the cutting blade is exposed for cutting;

a bell crank having a first end pivotally connected to the support arm for movement about a first axis, having a second end spaced from the first end and having a cam follower;

a link arm having opposite ends, one of the link arm ends being pivotally connected to the second end of the bell crank for movement about a second axis and the other of the link arm ends being pivotally connected to the blade guard for movement about a third axis; and a cam plate connected to the cutting unit, the cam plate having a cam surface engaging the cam follower so that movement of the cutting unit from the non-cutting position to the cutting position causes movement of the blade guard from the surrounding position to the non-surrounding position, the cam plate also having a lost motion member including a surface opposing and generally parallel to the cam surface, so that the lost motion member prevents manual movement of the blade guard whenever the cutting unit is out of the non-cutting position and so that the blade guard is freely manually movable to the non-surrounding position whenever the cutting unit is in the non-cutting position, and the cam plate having means for preventing movement of the cutting unit from the non-cutting position to the cutting position when the blade guard has been manually pivoted to the non-surrounding position.

10. A cutting tool as set forth in claim 9 wherein the means on the cam plate for preventing movement of the cutting unit from the non-cutting position to the cutting position when the blade guard has been manually pivoted to the non-surrounding position comprises an end on the lost motion member, the end having a surface engaging the cam follower whenever the blade guard is manually pivoted to the non-surrounding position.

11. A cutting tool as set forth in claim 9 wherein the bell crank has thereon a stop member contacting the link arm when the blade guard is moved to the non-surrounding position and the cutting unit is in a non-cutting position to prevent the third pivot axis from passing over a line extending between the second pivot axis and the arbor axis.

12. A cutting tool as set forth in claim 9 wherein the cutting unit includes a stop member contacting the blade guard whenever the blade guard is moved to the non-surrounding position and the cutting unit is in a cutting position to prevent the third pivot axis from passing over a line extending between the second pivot axis and the arbor axis.

13. A cutting tool as set forth in claim 9 wherein the cam plate includes a keyway and wherein the cutting unit includes a housing having thereon a locating key contacting the keyway so that the cam plate is pivotally adjustable about the locating key to an optimum operating position relative to the cam follower.

14. A cutting tool as set forth in claim 9 wherein the cutting unit has a first index, and wherein the blade guard has a second index, and wherein the cam plate is pivotally adjustable relative to the cutting unit to cause movement of the cam follower, bell crank, link arm, and blade guard so that when the second index on the blade guard is in alignment with the first index on the housing, the cam plate is in the optimum operating position.

15. A cutting tool as set forth in claim 9, the cutting tool further including a leaf spring member connected between the support member and the bell crank to bias the blade guard to the surrounding position.

16. A cutting tool comprising:

a base including a support member;

a pivot shaft having a longitudinal axis and being supported by the support member;

an arm mounted on the pivot shaft for pivotal movement about the axis;

a cutting unit mounted on the arm for movement therewith between cutting and non-cutting positions, the cutting unit including a cutting blade having a lower portion, including a housing having a first index and including a cam plate having a cam surface and being pivotally connected to the cutting unit for pivotal adjustment relative to the cutting unit to an optimum operating position;

a blade guard supported for pivotal movement between a surrounding position wherein the blade guard surrounds the lower portion of the blade and a non-surrounding position wherein the lower portion of the blade is exposed for cutting, and wherein the blade guard has a second index; and an actuating linkage connecting the support member to the blade guard to cause movement of the blade guard between the surrounding and the non-surrounding positions in response to movement of the cutting unit between the non-cutting and cutting positions, the actuating linkage including a cam follower connected to the support member and being positioned for movement along the cam surface, and wherein the cam follower is connected to the blade guard to cause movement of the blade guard between the surrounding and non-surrounding position in response to movement of the cam follower along the cam surface so that pivotal adjustment of the cam plate relative to the cutting unit causes movement of the actuating linkage and rotation of the blade guard and so that the second index of the blade guard is alignable with the first index on the housing to indicate that the cam plate is in the optimum operating position.

17. A cutting tool as set forth in claim 16 wherein the actuating linkage includes a bell crank supporting the cam follower, the bell crank including one end connected to the support member and an opposite end spaced from the one end, the actuating linkage further including a link member having one end connected to the opposite end of the bell crank and having a second end connected to the blade guard, and wherein the blade guard is freely movable to the non-surrounding position whenever the cutting unit is in the non-cutting position.

18. A cutting tool as set forth in claim 16 wherein the cutting unit includes an arbor mounted for rotation about an arbor axis, wherein the cutting blade is mounted on the arbor for rotation therewith, wherein the actuating linkage includes a bell crank mounted for pivotal movement relative to the cutting unit about a first axis, the one end of the link member pivots relative to the bell crank about a second axis, and the second end of the link member pivots relative to the bell crank about a third axis, and wherein the bell crank includes a stop member adapted to contact the link member whenever the blade guard is moved to the non-surrounding position while the cutting unit is in a non-cutting position, the stop member preventing the third pivot axis from passing over a line extending between the second pivot axis and the arbor axis.

19. A cutting tool as set forth in claim 18 wherein the cutting unit includes a second stop member adapted to contact the blade guard when the blade guard is moved to the non-surrounding position while the cutting unit is in a cutting position, the second stop member preventing the third pivot axis from passing over the line extending between the second pivot axis and the arbor axis.

20. A cutting tool as set forth in claim 18 wherein the first index comprises an index line formed in the housing of the cutting unit and wherein the second index comprises an edge on the blade guard, the cutting tool further comprising means for securing the cam plate in the optimum operating position.

* * * * *